United States Patent [19]
Kaneko

[11] Patent Number: 5,440,700
[45] Date of Patent: Aug. 8, 1995

[54] MICROPROCESSOR INCLUDING DEVICE FOR DETECTING PREDETERMINED INSTRUCTION AND GENERATING BUS CYCLE

[75] Inventor: Hiroaki Kaneko, Tokyo, Japan

[73] Assignee: NEC Corporation, Tokyo, Japan

[21] Appl. No.: 891,556

[22] Filed: May 29, 1992

[30] Foreign Application Priority Data

May 29, 1991 [JP] Japan ................................. 3-124242

[51] Int. Cl.$^6$ ............................................. G06F 11/30
[52] U.S. Cl. .................................... 395/375; 395/500; 395/183.1; 364/264; 364/264.1; 364/264.5; 364/DIG. 1
[58] Field of Search ........................ 371/19, 15.1, 16.1, 371/19; 395/375, 500, 575

[56] References Cited

U.S. PATENT DOCUMENTS

| | | | |
|---|---|---|---|
| 4,308,581 | 12/1981 | Raghunathan | 371/19 |
| 4,881,228 | 11/1989 | Shouda | 371/19 |
| 5,134,701 | 7/1992 | Mueller et al. | 371/19 |
| 5,142,679 | 8/1992 | Owaki et al. | 371/19 |
| 5,289,587 | 2/1994 | Razban | 395/375 |
| 5,361,348 | 11/1994 | Nakamoto | 395/575 |

OTHER PUBLICATIONS

"80386 Hardware Reference Manual";1986, Intel Corporation, US, Santa Clara; pp. 3-18, line 1—pp. 3-19, line 11.

Primary Examiner—William M. Treat
Attorney, Agent, or Firm—Whitham, Curtis Whitham & McGinn

[57] ABSTRACT

A microprocessor comprises a program counter for holding the address where the halt instruction is detected, a terminal for outputting a special status signal, a bus cycle control unit for generating the halt instruction indication bus cycle, and an execution unit for transferring the content of the program counter to the bus cycle control unit and requesting the start of the halt instruction indication bus cycle.

Thus, the address where the processor halt instruction has been executed and other internal information are informed to an external, so that precise and certain debugging environment is obtained.

5 Claims, 5 Drawing Sheets

MICROPROCESSOR INCLUDING DEVICE FOR DETECTING PREDETERMINED INSTRUCTION AND GENERATING BUS CYCLE

BACKGROUND OF THE INVENTION

1. Field of the Invention

The present invention relates to a microprocessor, and more specifically to a status notice of a microprocessor having an instruction processing function for executing a freezing or a temporary halt in the course of the execution of an instruction.

2. Description of Related Art

An instruction set of a microprocessor may contain an instruction for interrupting or temporarily stopping the execution of the instruction in order to prevent the execution of processing of subsequent instructions. For example, this instruction can be exemplified by a HALT instruction in a 32-bit microprocessor i80386 of Intel Corp. This HALT instruction has a function of preventing the execution of instructions described after the HALT instruction and holding the internal status of the microprocessor. This condition is called a "halt condition". The halt condition is released by activation of an external terminal for a reset, a non-maskable interrupt or a maskable interrupt.

When a reset request is activated, the microprocessor is initialized, similarly to the case in which an instruction other than the HALT instruction is being executed. On the other hand, when a non-maskable interrupt request or a maskable interrupt request is activated, an interrupt processing is executed, similarly to the case in which an instruction other than the HALT instruction is executed. The interrupt processing is generally acknowledged at the completion of the execution of the instruction. However, the interrupt request is immediately acknowledged when the microprocessor is in the halt condition.

In the microprocessor i80386 mentioned above, status of register resources (PC: Program Counter, CS: Code Segment register, PSW: Program Status Word) are automatically saved in a stack area within a memory when the interrupt is acknowledged. They are saved in order to restart, after the completion of the interrupt processing, the execution of the interrupted instruction sequence from an instruction located at an address arranged next to the address where the HALT instruction has been arranged.

The halt/interrupt instruction typified by the HALT instruction is used for the following purposes:

1) Stop of the microprocessor at the completion of the instruction execution processing.

2) Waiting for a real time processing started by an interrupt request.

3) Debugging by substitution of an instruction in a program.

When a halt/interrupt instruction is executed, there occurs no external change in the status of terminals such as a terminal for starting a bus cycle. Thus, it is necessary to detect at which position of the instruction sequence the status had changed to the halt condition in the course of debugging of the program.

In the microprocessor i80386 as mentioned above, the transition to the halt condition can be recognized by starting a special bus cycle called "HALT Indication Cycle". The halt indication cycle has a particular value ("$1011_b$" where the suffix "b" means a binary notation) for a status signal (BE#3-BE#0) for recognizing the kind of the bus cycle, in order to distinguish it from the bus cycles for access to the memory and an I/O (input/output) unit.

The bus cycle is generally divided into two kinds: a write type for driving a data bus terminal by the microprocessor and a read type for maintaining the data bus terminal in a high impedance condition (Hi-Z). The halt indication cycle of the microprocessor i80386 is the write type bus cycle in which all address bus terminals ($A_{31}$–$A_2$) are driven to "0", and an indefinite value is driven to data bus terminals ($D_{31}$–$D_0$).

Among other methods of informing of the transition to the halt condition, there is another method used in the 16-bit microprocessor MC68000 of Motorola Inc. The microprocessor MC68000 comprises a terminal HALT used only for indicating the halt condition. This terminal is activated when the microprocessor is transited to the HALT condition. The terminal HALT is an input/output terminal which not only indicates the halt condition as the output terminal, but also it can be activated as the input terminal from the external when the microprocessor is in a condition other than the halt condition, so that the microprocessor is forcibly transited temporarily to the halt condition.

In this case, the special bus cycle for the indication of the halt condition is not started.

In the case of debugging a program including a halt/interrupt instruction, it is necessary to know the register resource or the internal status of the microprocessor when the halt/interrupt instruction has been executed.

In the debugging, the most important register resource is a program counter representing until where the instruction sequence has been processed. It is possible to know the flow of the program execution in some degree by observing the status of the address bus terminal outputted in the course of the memory read cycle (fetch cycle) for fetching an instruction.

It is also possible to guess the range of the address in which the halt/interrupt instruction has been executed, by storing the status of the address bus terminal in the fetch cycle issued just before the start of the halt display cycle or the activation of the terminal HALT.

However, from the status of the address bus terminal in the course of the fetch cycle, it is not possible to correctly identify the address where the halt/interrupt instruction has been executed, in the following situations:

(1) In the case that the address bus terminal is insufficient for the identification of the byte address:

In the microprocessor i80386 mentioned above, the program counter has a width of 32 bits, while the address bus terminal has a width of 30 bits ($A_{31}$–$A_2$) to identify the word address (32-bit unit data). Thus, it is impossible to know at which byte within the word address is positioned the HALT instruction which had caused the transition to the halt condition.

(2) In the case that the microprocessor executes a pipelined processing:

In order to improve the instruction executing performance, a pipelined processing is adopted in which one instruction is divided into a plurality of processings (stages) and the plurality of processings are executed at the same time. Typical pipeline stages are composed of (1) instruction code fetch, (2) instruction decode, (3) calculation of the effective address of the memory operand, (4) address translation from a virtual address to a physical address (in the case of adopting the virtual memory method), (5) reading of the operand, (6) execution of the instruction and (7) store of the result.

In the case that a large number of pipeline stages are adopted in this way, the "instruction code fetch" precedes the "store of the result" (which is positioned at the end of a series of execution stages) by several instructions. Thus, when the issue of the halt indication cycle or the activation of the terminal HALT is detected from the external, the address indicated in the just preceding fetch cycle has preceded the address of the instruction transited to the halt condition, and therefore, it is necessary to correct the address.

However, it is not possible to identify the number of the instructions by which the fetch cycle precedes, because the processing times of the respective pipelined stages is different dependent upon instructions. (3) In the case that instruction codes are stored in a cache memory:

In the case of the microprocessor having an instruction code cache memory for aching instruction codes (for example, the microprocessor i80386), if the instruction sequence is stored in the instruction code cache memory (in the case of hitting), an instruction is not fetched from the external memory (the fetch cycle is not staffed), and the instruction code is supplied from the instruction code cache memory.

Thus, in the case that it is transited to the halt condition when the instruction code cache memory is hit, the just preceding fetch cycle has a completely meaningless value in the address detection.

SUMMARY OF THE INVENTION

Accordingly, it is an object of the present invention to provide a microprocessor which has overcome the above mentioned defect of the conventional one.

Another object of the present invention is to provide a microprocessor which can easily inform the external of the internal status at the time of the transition to the halt condition, without increasing the number of external terminals.

The above and other objects of the present invention are achieved in accordance with the present invention by a microprocessor which includes a particular instruction for executing a freezing or a temporary halt of an instruction execution, comprising means for detecting the particular instruction and generating a bus cycle, first output means for outputting a particular status signal in synchronism with the generated bus cycle, and second output means for outputting the content of a program counter to one of an address bus and a data bus, so that the content of the program counter is informed to an external by the execution of the particular instruction.

In a preferred embodiment, the second output means outputs the content of the program counter to the address bus, and there is further provided a third out-put means for outputting the content of a processor status word to the data bus in synchronism with the data bus cycle generated by the data cycle generating memos, so that the contents of the program counter and the processor status word are informed to the external by the execution of the particular instruction.

The above and other objects, features and advantages of the present invention will be apparent from the following description of preferred embodiments of the invention with reference to the accompanying drawings.

DESCRIPTION OF THE PREFERRED EMBODIMENTS

Figure 1:
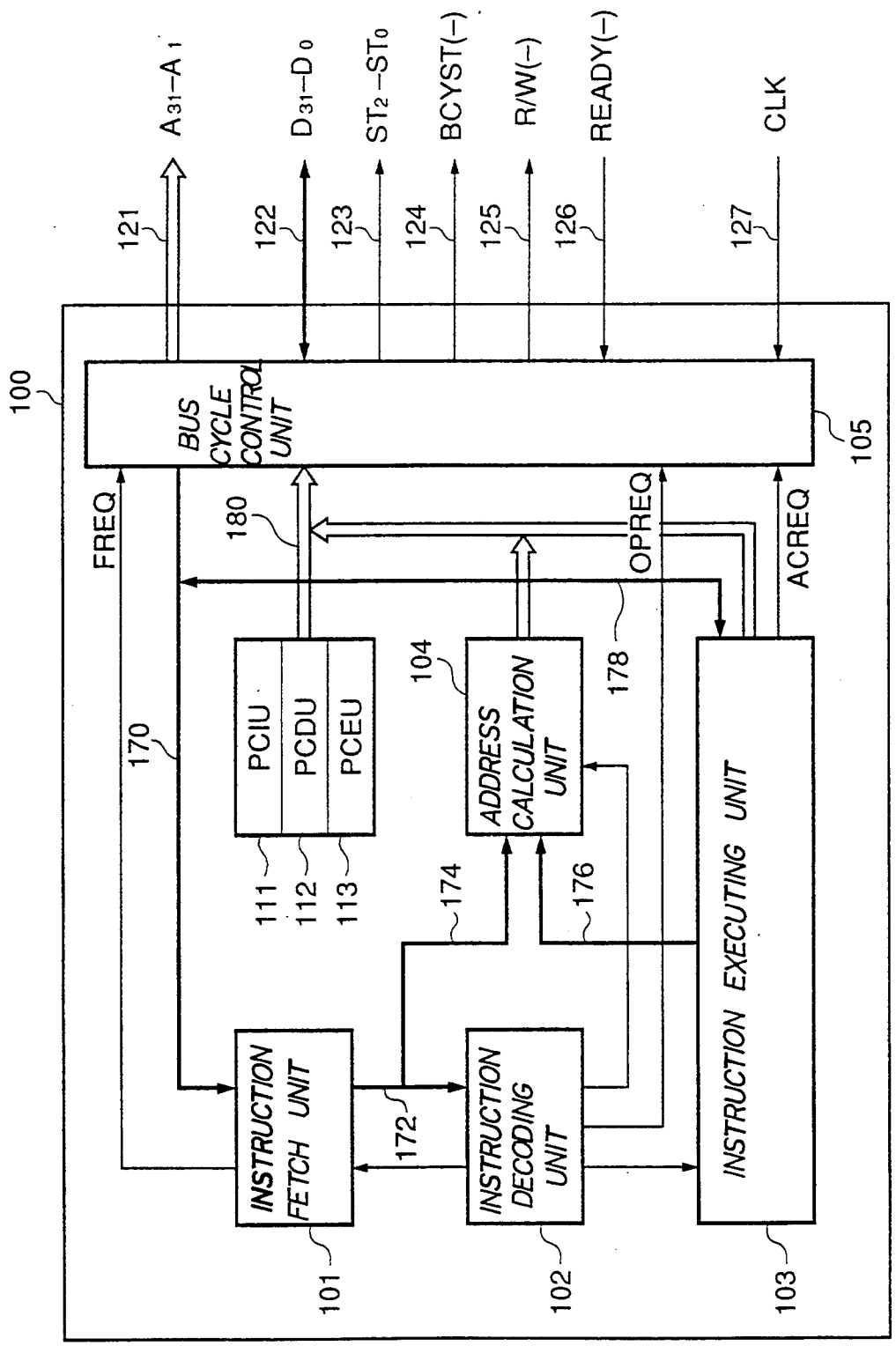
FIG. 1 is a block diagram of an embodiment of the microprocessor in accordance with the present invention.

Referring to FIG. 1, there is shown a block diagram of a microprocessor 100 having a HALT instruction as a halt/interrupt instruction in accordance with the present invention.

In order to execute a pipelined processing, the microprocessor 100 comprises an instruction fetch unit (labelled an "IU" in the drawing) 101, an instruction decoding unit (labelled a "DU" in the drawings) 102, an instruction executing unit (labelled an "EU" in the drawings) 103, an effective address calculation unit (labelled an "AU" in the drawings) 104, and a bus cycle controlling unit. (labelled a "BU" in the drawings) 105. In addition, the microprocessor 100 comprises program counters PCIU 111, PCDU 112 and PCEU 113 of 32 bit width for holding the address of instructions processed by the instruction fetch unit IU 101, the instruction decoding unit DU 102, and the instruction executing unit EU 103, respectively.

The instruction fetch unit IU 101 controls the start of a fetch cycle and accumulates instruction codes fetched from an external in a fetch cycle. Thus, the instruction fetch unit IU 101 is supposed to have a configuration comprising an instruction code cache memory. The instruction code has either a 16 bit length or a 32 bit length.

The instruction decoding unit DU 102 decodes instruction codes accumulated in the instruction fetch unit IU 101 and generates signals indicative of a processing inherent to the respective instructions. The signals generated by the instruction decoding unit DU 102, partly omitted in FIG. 1, are given as operation indicating signals to other units.

The instruction executing unit EU 103 comprises 32 general registers of 32 bit width and 32 operation units of 32 bit width, and executes an instruction execution processing designated by the instruction decoding unit DU 102. The internal control may be executed either by hardware such as a wired logic or by using a microprocessor.

When the instruction decoding unit DU 102 detects an instruction containing an access to a memory or an I/O device, the effective address calculation unit AU 104 calculates an address with respect to an operand. Elements used for the address calculation are a displacement value contained in an instruction code and a value of a general register. The former is supplied by the instruction fetch unit IU 101, and the latter is supplied by the instruction executing unit EU 103.

The bus cycle controlling unit BU 105 generates an external bus cycle on the basis of an address, data and a start request given from other units. The instruction code and the operand data of the dam read from the external in the course of the bus cycle are supplied to the instruction fetch unit IU 101 and the instruction executing unit EU 103, respectively.

As shown in FIG. 1, the respective units are interconnected through a bus structure.

For transferring an instruction code, the bus cycle controlling unit BU 105 is connected to the instruction fetch unit IU 101 through an internal bus 170, and this instruction fetch unit IU 101 is also connected to the instruction decoding unit DU 102 through an internal bus 172. For transferring address elements used for the address calculation, the instruction fetch unit IU 101 and the instruction executing unit EU 103 are connected to the effective address calculation unit AU 104 through internal buses 174 and 176, respectively. The instruction executing unit EU 103 is also connected to the bus cycle controlling unit BU 105 to transfer a read operand and a write operand in both directions through an internal bus 178. The effective address calculation unit AU 104 is connected to the bus cycle controlling unit BU 105 to transfer an effective address through an internal bus 180. The program counter PCIU 111, the program counter PCDU 1121 and the program counter PCEU 113 are connected to the bus cycle controlling unit BU 105 through the internal bus 180 to transfer an address used in the course of a bus cycle other than the operand access. The instruction executing unit EU 103 is connected to the bus cycle controlling unit BU 105 through the internal bus 180 to transfer an address used in the course of an arbitrary bus cycle.

In FIG. 1, bus cycle start requests from the instruction fetch unit IU 101, the instruction decoding unit DU 102 and the instruction executing unit EU 103 are represented by a FREQ signal, an OPREQ signal and an ACREQ signal, respectively. These request signals practically consist of a plurality of signals for representing the kind of bus cycles and a plurality of signals for determining a timing.

Now, an interface function between the bus cycle controlling unit BU 105 and external devices will be described, The bus cycle controlling unit BU 105 comprises, in relation to the bus cycle, address bus terminals $A_{31}-A_1$ 121 for outputting a 31-bit half word address (16-bit unit address), data bus terminal $D_{31}-D_0$ 122 for sending and receiving 32-bit data, a group of output terminals 123, 124 and 125 for outputting status signals $ST_2-ST_0$ indicating the kind of bus cycle, a signal BCYST(−) for indicating the staff timing of the bus cycle and a signal R/W(−) for discriminating a read/write type bus cycle, respectively, and a terminal 126 receiving from an external a signal READY(−) indicating the end of the bus cycle. In this description, the mark (−) means that it is a negative logical signal.

Figure 3:
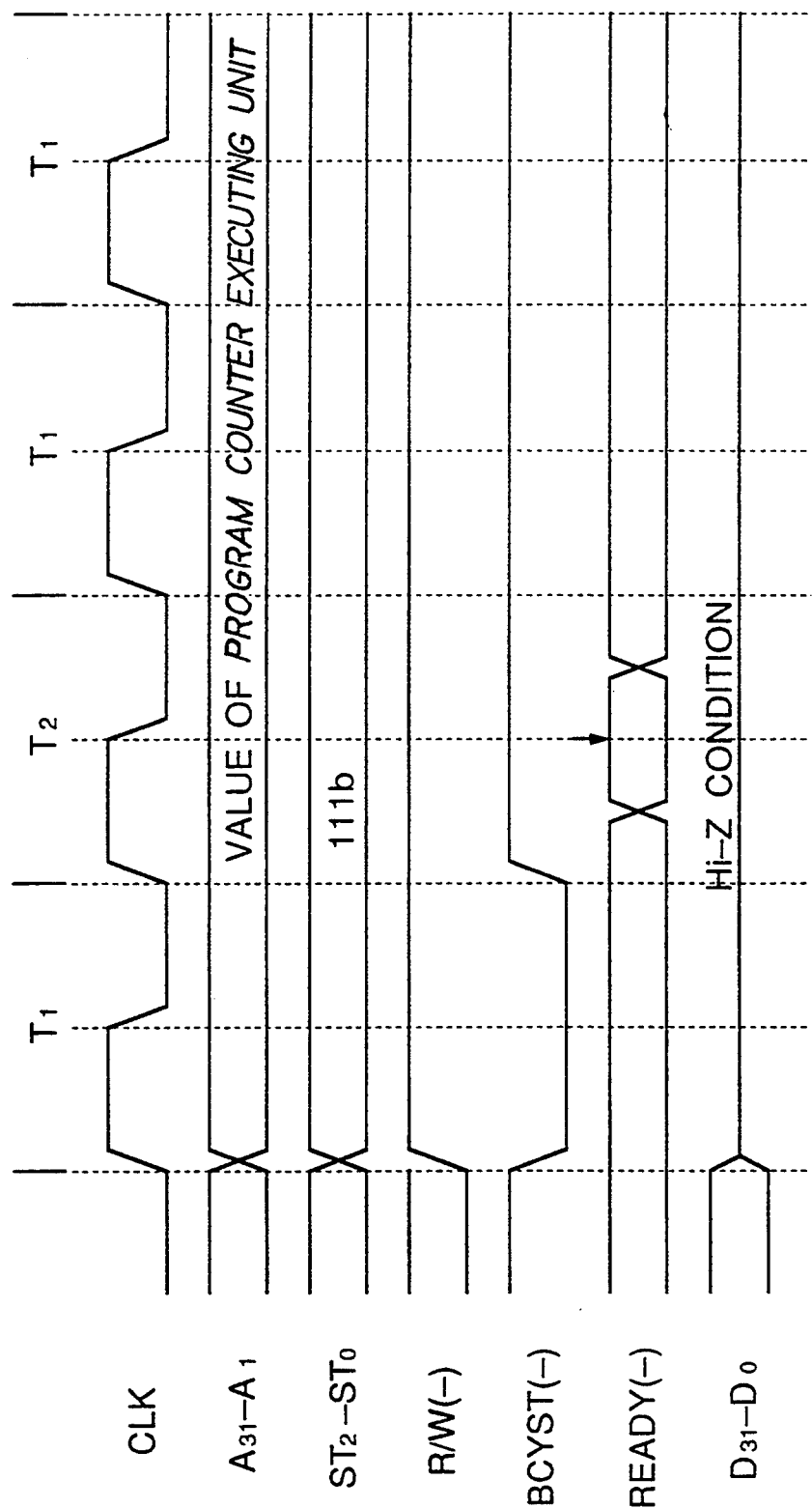
FIG. 3 is a timing chart of the halt indication cycle in the first embodiment.

A basic bus cycle consists of two states in synchronism with a reference clock signal CLK 127 applied to a clock input terminal 127 of the microprocessor 100. As shown in FIG. 3, at the beginning of the first state T1, the address bus terminals $A_{31}-A_1$ 121, and the output terminals 123 and 125 for the status signal $ST_2-ST_0$ and the discrimination signal R/W (−) are driven. Further, in the course of the state T1, the output terminal 124 for the timing signal BCYST(−) 124 is activated. In the course of the write type bus cycle, the data for writing is driven to the data bus terminal $D_{31}-D_0$ 122 at the center of the state T1.

At the end of the second state T2, the status of the terminal 126 for discrimination signal R/W (−) is sampled. If it is in an activated condition, the bus cycle has then been completed, and the status is transferred to the idle state T1. If the discrimination signal R/W (−) terminal 126 is not activated, the state T2 is repeated.

In the course of the read type bus cycle, the data on the data bus terminals $D_{31}-D_0$ 122 is sampled by the microprocessor 100 at the end of the state T2.

The status of the status signal $ST_2-ST_0$ terminal 123 is used, to discriminate the kind of bus cycle as shown in the following:

| ST | | | |
|---|---|---|---|
| 2 | 1 | 0 | Kind of Bus Cycle |
| 0 | 0 | 0 | (not used) |
| 0 | 0 | 1 | memory access (string data) |
| 0 | 1 | 0 | memory access (single data) |
| 0 | 1 | 1 | instruction code fetch |
| 1 | 0 | 0 | (not used) |
| 1 | 0 | 1 | machine fault indication |
| 1 | 1 | 0 | I/O access |
| 1 | 1 | 1 | halt indication |

The bus cycle is defined for a memory access, an I/O access, and in addition, a "halt indication" for notifying that the computer has been transited to the halt condition.

Now, operation of the present embodiment will be described.

For the control of the bus cycle controlling unit BU 105, when the instruction fetch unit IU 101 requests a start of the fetch cycle, an address contained in the program counter PCIU 111 is transferred to the bus cycle controlling unit BU 105, and the read type bus cycle is staffed so as to output "$011_b$" to the $ST_2-ST_0$ terminal 123. At the end of the bus cycle, the status on the data bus terminal $D_{31}-D_0$ 122 is sampled and transferred to the instruction fetch unit IU 101.

When the instruction decoding unit DU 102 detects the necessity of a read operand (single) for a memory read or an I/O read, an effective address is calculated by the effective address calculation unit AU 104 before the execution processing by the instruction executing unit EU 103, and is transferred to the bus cycle controlling unit BU 105. The read bus cycle is started so as to output "$010_b$" or "$110_b$" to the terminals $ST_2-ST_0$ 123. At the end of the bus cycle, the status on the dam bus terminals $D_{31}-D_0$ is sampled and transferred to the instruction executing unit EU 105.

When the instruction decoding unit DU. 102 detects the necessity of a write operand (single) for a memory write or an I/O write, an effective address is calculated by the effective address calculation unit AU 104 before the execution processing by the instruction executing unit EU 103, and is transferred to the bus cycle controlling unit BU 105. At the end of the execution processing by the instruction executing unit EU 105, operand data is transferred from the instruction executing unit EU 103 to the bus cycle controlling unit BU 105, and at the same time, the start of a write type bus cycle is required. The write bus cycle for outputting the operand data and "$010_b$" or "$110_b$" to the data bus terminals $D_{31}-D_0$ 122 and a terminal $ST_2-ST_0$ 123, respectively, is started.

In the case of one instruction requiring a plurality of operand accesses (such as a character string handling instruction), an access of a string type operand is executed. In this case, an address necessary for the bus cycle is transferred from the instruction executing unit EU 103 to the bus cycle controlling unit BU 205 in the course of the instruction execution processing, while a start request of the bus cycle for outputting "$001_b$" to the terminals $ST_2$-$ST_0$ 123 is issued from the instruction executing unit EU 103 directly to the bus cycle controlling unit BU 105. The operand data transferred through the data bus terminal $D_{31}$-$D_0$ 122 is transferred between the instruction executing unit EU 103 and the bus cycle controlling unit BU 105.

The bus cycle for output "$101_b$" to the terminal $ST_2$-$ST_0$ 123 (machine fault indication) will not be explained in this specification.

Now, the execution of the HALT instruction will be explained.

The instruction decoding unit DU 102 decodes a HALT instruction, and then instructs the instruction fetch unit IU 101 to stop the supply of succeeding instruction codes. The effective address calculation unit AU 104 cannot receive the operation instruction because the HALT instruction does not accompany an operand. At the same time, the execution processing of the HALT instruction is instructed to the instruction executing unit EU 103. This instruction executing unit EU 103 transfers a content of the program counter PCEU 113 to the bus cycle controlling unit BU 105 as the address for the bus cycle. The program counter PCEU contains an address storing the HALT instruction.

Simultaneously, a start request of the bus cycle for outputting "$111_b$" to the terminal $ST_2$-$ST_0$ is issued from the instruction executing unit EU 103. A read type bus cycle is stared in order to prevent the increase of the electric power consumption caused by the driving of the data bus terminal $D_{31}$-$D_0$ 122. If there is no need for taking account for the electric power consumption, it does not need to use the read type bus cycle.

In the course of the bus cycle started by the request, from the beginning of the state T1, a content of the program counter PCEU 113, "$111_b$" and "$1_b$" are outputted to the address bus terminals $A_{31}$-$A_1$ 121, the terminals $ST_2$-$ST_0$ 123 and the terminal R/W(−) 125, respectively. The terminal BCYST(−) 124 is activated in the period of the state T1 like the other bus cycles (driven to "$0_b$").

After the end of the first T2 state, the bus cycle controlling unit BU 105 does not execute the status sampling of the terminal READY (−) 126 and a bus cycle end holding control, in order to simplify the external hardware for activating the terminal READY(−) 126 with respect to a bus cycle.

The data bus terminals $D_{31}$-$D_0$ 122 are maintained in a Hi-Z condition in both of T1 and T2 states.

The supply of the instruction codes following the HALT instruction from the instruction fetch unit IU 101 to the instruction decoding unit DU 102 is stopped and the instruction of the execution processing is not given from the instruction decoding unit DU 102 to the instruction executing unit EU 103. Thus, the instruction executing unit EU 103 is stopped until a reset request or an interrupt request (not shown in Figures) is added from the external device, and the microprocessor 100 is transited into the HALT condition.

When the instruction executing unit EU 103 detects a reset request or an interrupt request applied from the external, the instruction executing unit EU 103 instructs a restart to the other units, and the microprocessor 100 is released from the HALT condition.

When a bus cycle is issued (when a terminal BCYST (−) is activated), it is possible to know the address of the HALT instruction from the external, by sampling the location address of an address bus terminals $A_{31}$-$A_1$ 121.

After the issue of the bus cycle for the halt indication, the bus cycle start is not requested to the bus cycle controlling unit BU 105 until the halt condition is released. Accordingly, a new state T1 is not generated, and the conditions of the address bus terminals $A_{31}$-$A_1$ 121, the output terminals $ST_2$-$ST_0$ 123 changed by the T1 state, and the R/W (−) terminal 125 maintain values outputted in the course of the bus cycle for the halt indication.

Therefor, not only when the halt indication cycle is issued but also until a halt condition release request (a reset or an interrupt request is applied to the microprocessor 100, it is possible to know, at any timing, the address in which the HALT instruction is set.

In a system in which the address bus terminals $A_{31}$-$A_1$ 121 are always observed by an LED indicator, a person can directly observe the location address of the HALT instruction.

The halt indication cycle of the present embodiment is shown in FIG. 3.

In this embodiment, The address bus terminals $A_{31}$-$A_1$ 121 have only 31 bits for an address space of 32 bits. However, it is not necessary to output the least significant bit (LSB) of the address, because the instruction code length is 16 bits or 32 bits.

Further, in this embodiment, the instruction executing unit EU 103 executes the start of the halt indication cycle. However, it is possible to modify the structure so that the instruction decoding unit DU 102 executes the start of the halt indication cycle.

Next, a second embodiment will be explained with reference to FIG. 2. In the first embodiment, only the location address of the HALT instruction is informed in the course of the halt indication cycle. The second embodiment is characterized in that the value of a processor status word (PSW) representing the status of the microprocessor is also informed.

Figure 2:
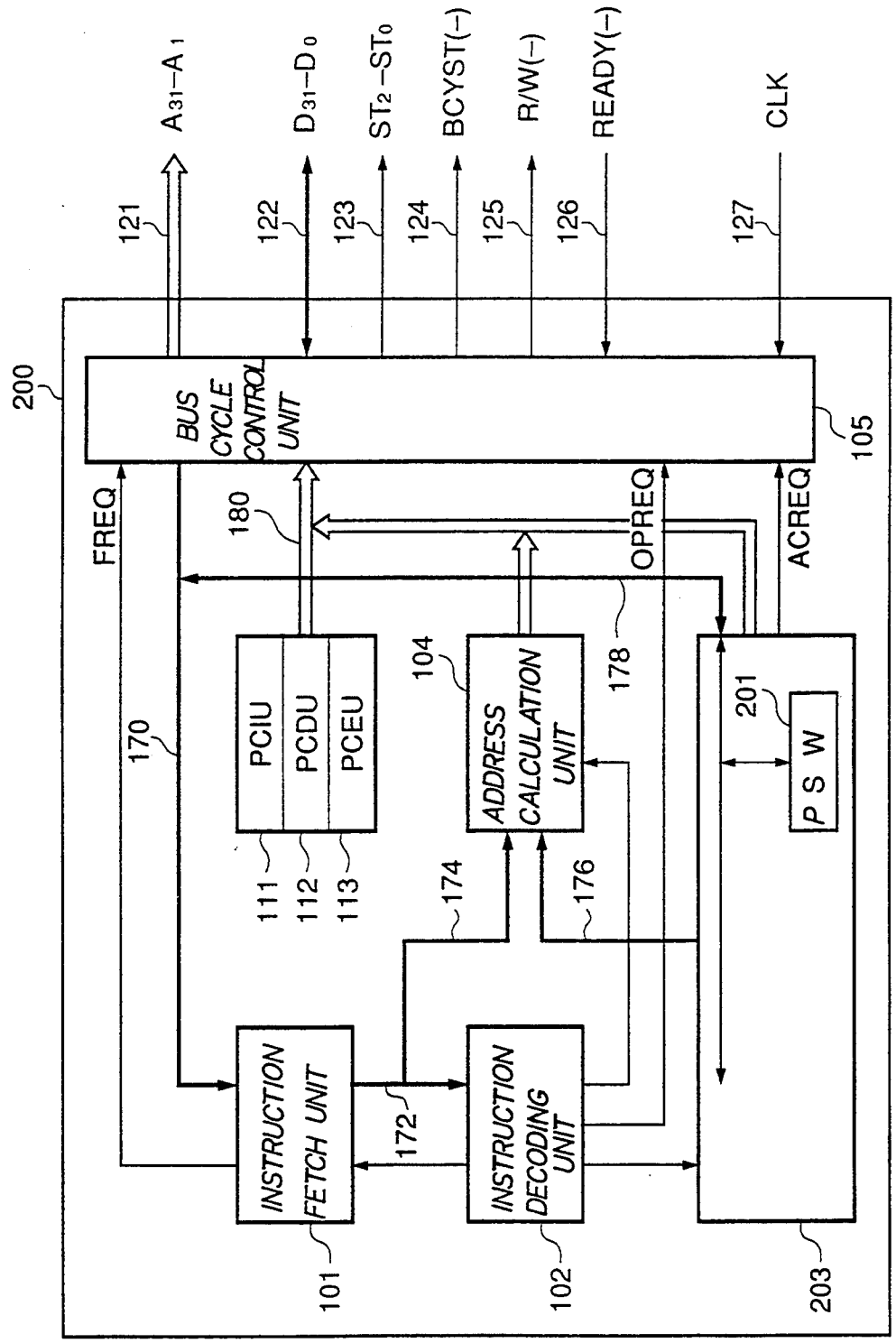
FIG. 2 is a block diagram of another embodiment of the microprocessor in accordance with the present invention.

In FIG. 2, the microprocessor 200 has the same configuration as that of the first embodiment excepting an instruction executing unit EU 203. The instruction executing unit. EU 203 comprises a PSW 201 of a 32-bit length including a flag representing the status of the integer arithmetic operation, a flag representing the status of a floating point arithmetic operation, and flags representing a control and status of an interrupt and an exception. The status of these flags is an important information in order to know the internal status of the microprocessor 200. However, the status of the PSW 201 can be referred only by a special transfer instruction, except that it is indirectly checked by a conditional branch instruction.

The PSW 201 is constituted so as to be able to execute the data transfer to and from the bus cycle controlling unit BU 105 as well as the transfer of the operand data, through an internal bus of the instruction executing unit EU 203.

In this second embodiment, the operation is identical to that of the first embodiment until the execution processing of the HALT instruction is instructed to the instruction executing unit EU 203. The instruction executing unit EU 203 transfers the content of the program counter PCEU113 to the bus cycle controlling unit BU 105 as an address for a bus cycle. Further, the content of the PSW 201 is transferred to the bus cycle controlling unit BU 105 as output data of the write type bus cycle.

At the same time, the bus cycle start request for outputting "$111_b$" to the terminals $ST_2-ST_0$ 123 is issued from the instruction executing unit EU 103. The write type bus cycle is started in order to output the value of the PSW 201 to the data bus terminal $D_{31}-D_0$ 123.

From the beginning of the T1 state in the course of the bus cycle started by the request, the content of the program counter PCEU 113 is outputted to the address bus terminals $A_{31}-A_1$, and "$111_b$" and "$0_b$" are outputted to the terminals $ST_2-ST_0$ 123 and the terminal R/W (−) 125, respectively. The terminal BCYST(−) 124 is activated (driven to "$0_b$") in the period of the T1 state, like in the course of other bus cycles.

To the data bus terminals $D_{31}-D_0$ 122, the content of the PSW 201 transferred to the bus cycle controlling unit BU 105 is outputted from the center of the T1 state.

The status sampling of the terminal READY(−) 126 and the bus cycle end holding control are executed in the same way as those of the first embodiment. The control for releasing of the halt condition is also executed in the same way of the first embodiment.

In order to know the status of the PSW after the HALT instruction is executed in the microprocessor 100 and transited into the halt condition, it is becomes necessary to execute the processing consisting of requesting an interrupt and then outputting the content of the PSW to the external.

On the other hand, in this second embodiment, the status of the PSW 201 is outputted to the data bus terminals $D_{31}-D_0$ 122 in the course of the halt indication cycle, the processings for the interrupt request and the status outputting become unnecessary. Further, similarly to the content of the program counter PCEU 113 outputted to the address bus terminals $A_{31}-A_1$ 121, the status of the data bus terminals $D_{31}-D_0$ 121 does not change during the halt condition. Thus, it is possible to observe the content of the PSW 201 by means of an LED indicator.

Figure 4:
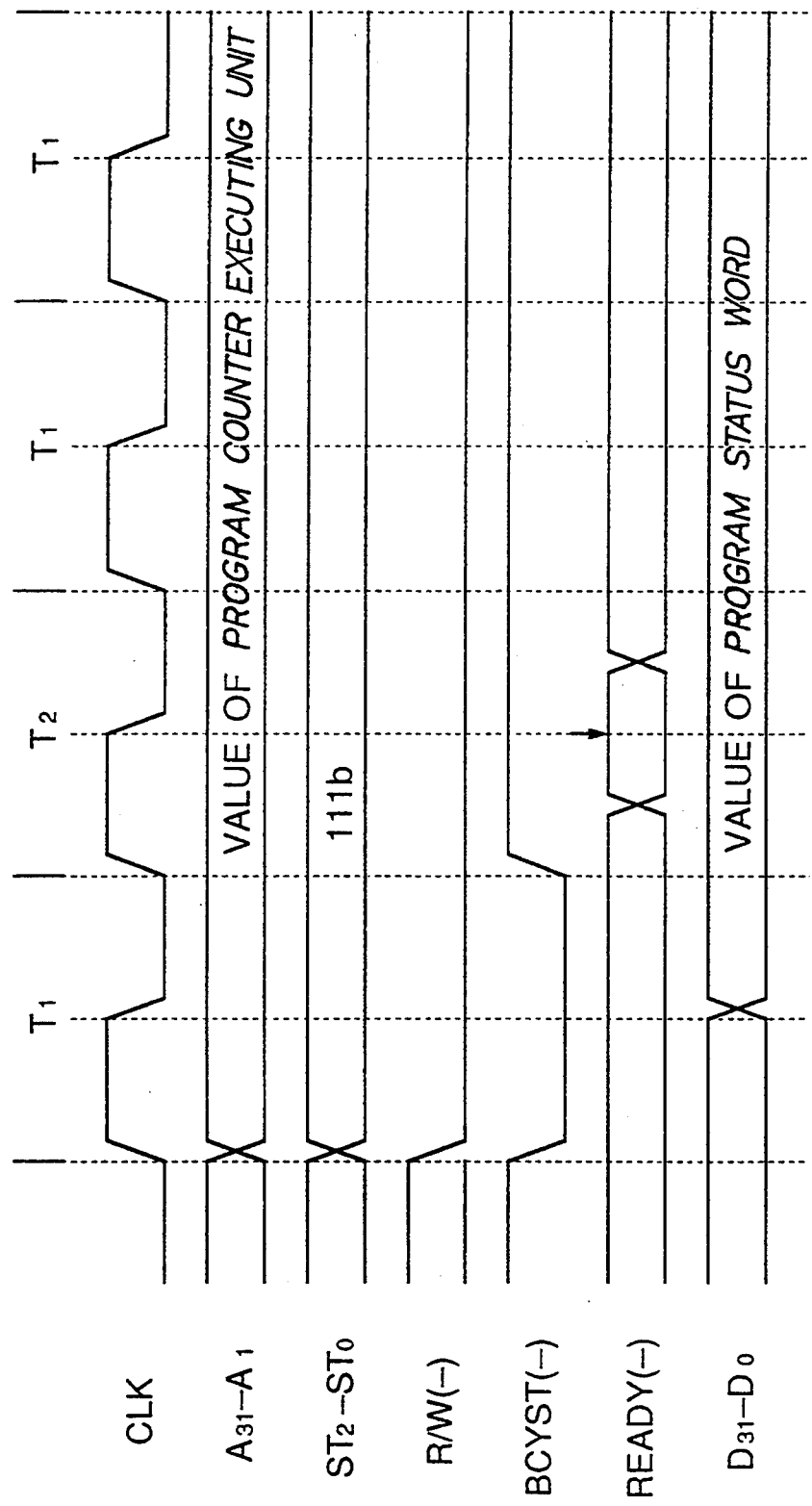
FIG. 4 is a timing chart of the halt indication cycle in the second embodiment.

The timing of the halt indication cycle in this second embodiment is shown in FIG. 4.

In this second embodiment, the operation is executed in such a way that the content of the program counter PCEU 113 and the content of the PSW 201 are outputted to the address bus terminals $A_{31}-A_1$ 121 and the data bus terminals $D_{31}-D_0$ 122, respectively, in the course of the halt indication cycle. However, it is possible to reverse the internal resources to be outputted easily by modifying a part of the control of the instruction executing unit EU 203 (for example, a partial modification of the microprogram), that is, to output the content of the PSW 201 and the content of the program counter PCEU113 to the address bus terminals $A_{31}-A_1$ 121 and the dam bus terminals $D_{31}-D_0$ 122, respectively.

Furthermore, it is easy to modify to the configuration in which the internal resources of the units other than the PSW 201 are outputted to the address bus terminals $A_{31}-A_1$ 121 or the data bus terminals $D_{31}-D_0$ 122.

The configuration of the bus cycle controlling unit BU 105 of this second embodiment and the first embodiment and its operation will be described with reference to FIG. 5.

A bus cycle start request signal FREQ from the instruction fetch unit IU 101, a bus cycle start request signal OPREQ from the instruction decoding unit DU 102 and a bus cycle start request signal ACREQ from the instruction executing unit EU 103 are arbitrated in accordance with the order of the access priority, and divided into signals $AC_3-AC_0$ representing the kind of the bus cycle and a signal ACSTB representing the timing of the request.

An address and data are transferred to the bus cycle controlling unit BU 105 through internal buses $IAD_{31}-IAD_1$ and $D_{31}-D_0$, respectively. A signal ACBUSY informs each unit that the bus cycle controlling unit BU 105 is in the course of starting a bus cycle and so a new bus cycle start request cannot be accepted.

Figure 5:
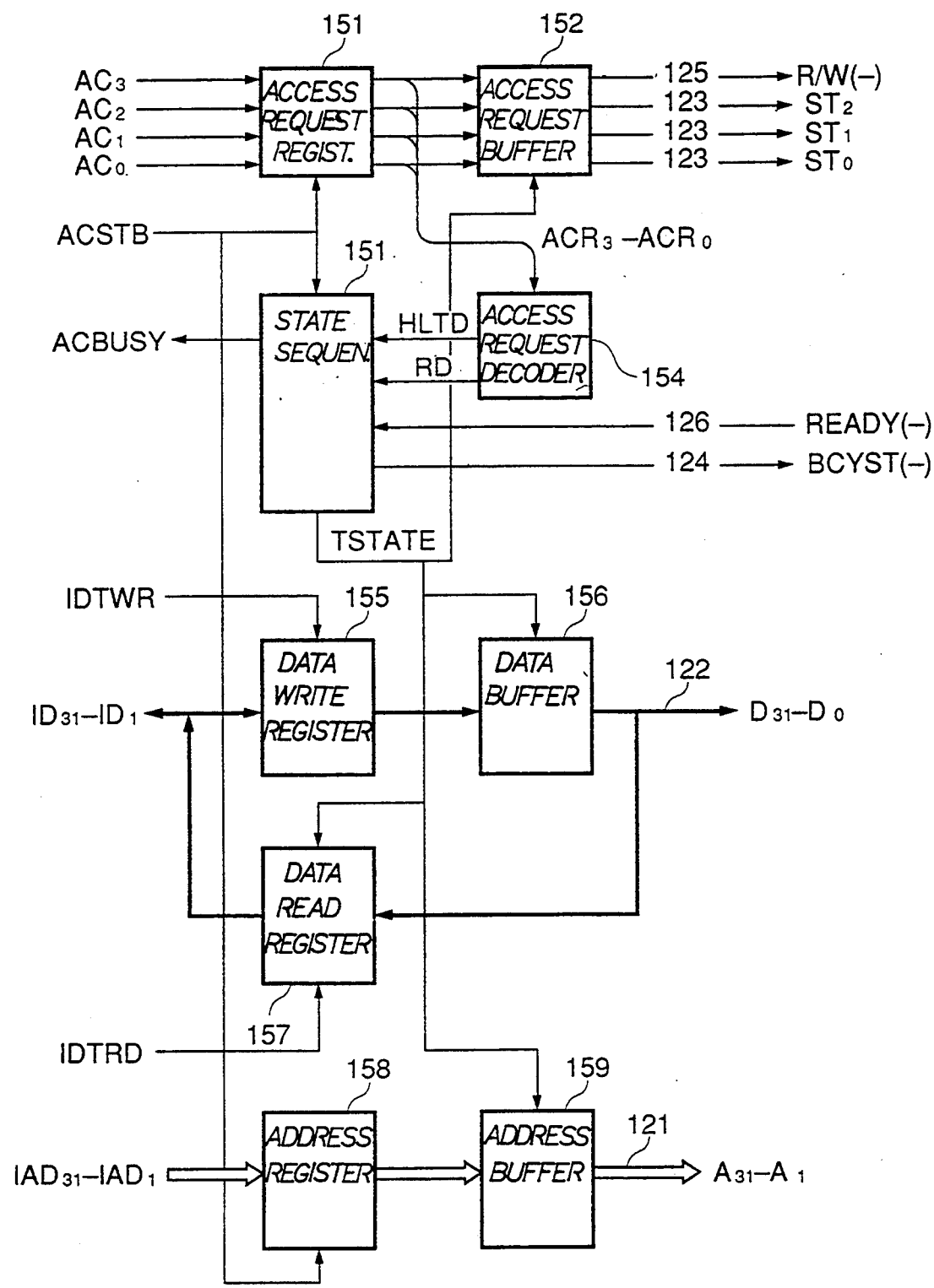
FIG. 5 is a block diagram of the bus cycle control unit in the first and second embodiments.

In FIG. 5, an access request register (labelled "ACR" in the drawings) 151 latches the signals $AC_3-AC_0$ in response to the signal ACSTB, and an access request buffer (labelled "ACB" in the drawings) 152 detects the status of a bus cycle by a Tstate signal composed of a plurality of signals, and drives the terminals $ST_2-ST_0$ 123 and the terminal R/W(−) 125 by the latched request (the signals $ACR_3-ACR_0$).

An access request decoder 154 (labelled "ACD" in the drawings) decodes the latched request and generates a signal RD showing that it is a read type access and a signal HLTD representing the halt indication cycle.

A state sequencer (hereinafter called "STSEQ") 153 manages the T state of the bus cycle and is started by the detection of the signal ACSTB, The other blocks are informed of the status of the T state by the Tstate signal composed of a plurality of bits.

If the bus cycle is not completed, the STSEQ generates a signal ACBUSY to prevent other units from generating a signal ACSTB. The STSEQ 153 detects the status of the terminal READY(−) 126 and controls the end of the bus cycle. When the start of the halt indication cycle is requested, the access request decoder ACD 154 generates a signal HLTD to prevent the waiting of the bus cycle end on the basis of the status of the terminal READY(−) 126. Further, the terminal BCYST(−) 125 is driven at the start of the bus cycle.

A data write register (labelled "DTWR" in the drawings) 155 latches a data on the internal bus $ID_{31}-D_0$ in response to a write signal IDTWR, and a data buffer 156 (labelled "DTB" in the drawings) drives a data latched by the Tstate signal, to the data bus terminals $D_{31}-D_0$ 122 in the course of a write type bus cycle. A data read register (labelled "DTRR" in the drawings) 157 detects the end of the read type bus cycle by the Tstate signal, and also comprises a buffer function of latching the status of the data bus terminals $D_{31}-D_0$ 122 and driving the internal bus $ID_{31}-ID_0$ in response to a read signal IDTRD.

An address register 158 (labelled "ADR" in the drawings) latches the address on the internal bus $IAD_{31}-IAD_1$ in response to an access request strobe signal ACSTB, and an address buffer (labelled "ADB" in the drawings) 159 drives the address latches by the Tstate signal, to the address bus terminal $A_{31}-A_1$ 121.

The kind of the bus cycle started by the bus cycle controlling unit BU 105 can be designated only by modifying the value of the access request signal AC3-AC0. In addition, the outputted address can be determined by the internal bus $IAD_{31}-IAD_1$, and the data outputted in the course of the write type bus cycle can be determined by the values of the internal bus $D_{31}-D_0$. Therefore, it is possible to control the bus cycle with a high adaptability.

As mentioned above, according to the present invention, it is possible to realize a microprocessor which can easily inform the external unit of the internal status at the time of the transition to the halt condition by means of address bus terminals and data bus terminals. These terminals are indispensable to conventional microprocessors, and therefore, the number of terminals is in no way increased by notification of the internal status.

It is possible to precisely and easily know the content of the program counter and the processor status word when the program is transited to the halt condition by using the microprocessor in accordance with the present invention. Thus, it is possible to realize an effective program debugging.

The invention has thus been shown and described with reference to the specific embodiments. However, it should be noted that the present invention is in no way limited to the details of the illustrated structures but changes and modifications may be made within the scope of the appended claims.

I claim:

1. A microprocessor which includes a particular instruction for executing a freezing or a temporary halt of an instruction execution, said microprocessor comprising:
   means for detecting said particular instruction and generating a bus cycle,
   first output means for outputting an encoded particular status signal of a plurality of bits in synchronism with said generated bus cycle, and
   second output means for outputting the content of a program counter to one of either an address bus or a data bus, so that the content of the program counter which holds a location address of said particular instruction, becomes known by an external unit by the execution of said particular instructions,
   wherein, after said bus cycle has been generated by said bus cycle generating means, a bus cycle start is requested only after said freezing or temporary halt is released, thereby maintaining a value of said content of said program counter during said bus cycle.

2. A microprocessor claimed in claim 1 wherein said second output means outputs the content of said program counter to said address bus,
   said microprocessor further comprising third output means for outputting the content of a processor status word to said data bus in synchronism with the bus cycle generated by the bus cycle generating means, so that the content of the program counter and the content of the processor status word become known by the external unit by the execution of said particular instruction.

3. A microprocessor according to claim 1, further comprising third output means for outputting the content of a processor status word to said data bus in synchronism with the bus cycle generated by the bus cycle generating means, so that the content of the program counter and the content of the processor status word become known by the external unit by the execution of said particular instruction.

4. A microprocessor according to claim 1, wherein said second output means outputs the content of said program counter to said address bus.

5. A microprocessor which includes a particular instruction for executing a freezing or a temporary halt of an instruction execution, said microprocessor comprising:
   a bus cycle controlling unit coupled to an external address bus and an external data bus;
   an instruction fetch unit coupled to said bus cycle controlling unit for controlling the start of a fetch cycle and for accumulating instruction codes fetched from an external unit in said fetch cycle;
   an instruction decoding unit coupled to said instruction fetch unit for decoding instruction codes accumulated in the instruction fetch unit and for generating signals indicative of a processing inherent to the respective instructions;
   an instruction executing unit controlled by said instruction decoding unit so as to execute a processing designated by said instruction decoding unit;
   an effective address calculation unit coupled to said instruction decoding unit and said instruction executing unit for calculating an address for an operand when said instruction decoding unit detects an instruction containing an access to a memory or an input/output (I/O) device;
   a program counter for holding the address of instructions processed by said instruction executing unit,
   the microprocessor being controlled such that said instruction decoding unit decodes said particular instruction, said instruction decoding unit instructs said instruction fetch unit to stop the supply of succeeding instruction codes, and at the same time, the execution processing instruction of said particular instruction is input to said instruction executing unit so that said instruction executing unit transfers a content of said program counter which then holds an address storing said particular instruction, to said bus cycle controlling unit, which in turn outputs said content of said program counter to one of either said external address bus or said external data bus.

* * * * *